(12) United States Patent
Bito et al.

(10) Patent No.: US 8,821,021 B2
(45) Date of Patent: Sep. 2, 2014

(54) FLUID DYNAMIC BEARING DEVICE

(75) Inventors: Kimihiko Bito, Kuwana (JP); Jun Hirade, Kuwana (JP)

(73) Assignee: NTN Corporation, Osaka-shi (JP)

( * ) Notice: Subject to any disclaimer, the term of this patent is extended or adjusted under 35 U.S.C. 154(b) by 438 days.

(21) Appl. No.: 13/121,807

(22) PCT Filed: Sep. 16, 2009

(86) PCT No.: PCT/JP2009/066115
§ 371 (c)(1),
(2), (4) Date: Mar. 30, 2011

(87) PCT Pub. No.: WO2010/044327
PCT Pub. Date: Apr. 22, 2010

(65) Prior Publication Data
US 2011/0176758 A1    Jul. 21, 2011

(30) Foreign Application Priority Data

Oct. 14, 2008  (JP) ................................. 2008-265158

(51) Int. Cl.
*F16C 32/06*  (2006.01)
(52) U.S. Cl.
USPC ........................................................ 384/107
(58) Field of Classification Search
USPC ......... 384/100, 107, 112, 113, 121, 122, 123, 384/124; 29/525.14, 898.07; 219/121.63, 219/121.64
See application file for complete search history.

(56) References Cited

U.S. PATENT DOCUMENTS

| 6,059,459 | A | 5/2000 | Ichiyama |
| 7,101,084 | B2 * | 9/2006 | Gomyo ......................... 384/107 |
| 7,121,725 | B2 * | 10/2006 | Aiello et al. .................. 384/107 |
| 7,401,979 | B2 * | 7/2008 | Ando et al. .................... 384/107 |

(Continued)

FOREIGN PATENT DOCUMENTS

| CN | 1391325 A | 1/2003 |
| CN | 1503882 A | 6/2004 |

(Continued)

OTHER PUBLICATIONS

Notification of Transmittal of Translation of the International Preliminary Report on Patentability (Form PCT/IB/338) of International Application No. PCT/JP2009/066115 mailed May 26, 2011, with Forms PCT/IB/373 and PCT/ISA/237.

(Continued)

*Primary Examiner* — Thomas R Hannon
*Assistant Examiner* — Adam D Rogers
(74) *Attorney, Agent, or Firm* — Westerman, Hattori, Daniels & Adrian, LLP

(57) ABSTRACT

A shaft member is provided with a shaft portion and a flange portion coupled with a lower end surface of the shaft portion. The shaft portion is formed into a complete circular shape in cross section, and the flange portion is provided with a through-hole in which a part of a circumferential region is retracted to a radially outer side with respect to a lower end of the shaft portion so as to exhibit a non-circular shape. The shaft portion and the flange portion are coupled with each other in a state of butting the lower end surface of the shaft portion and an upper end surface of the flange portion against each other. With this, a fluid path is formed by opening both end surfaces of the flange portion.

6 Claims, 8 Drawing Sheets

(56) References Cited

U.S. PATENT DOCUMENTS

| | | | |
|---|---|---|---|
| 7,435,003 B2 * | 10/2008 | Nakamura et al. | 384/112 |
| 7,819,585 B2 * | 10/2010 | Satoji et al. | 384/100 |
| 7,972,065 B2 * | 7/2011 | Hino et al. | 384/107 |
| 8,297,844 B2 * | 10/2012 | Hirade et al. | 384/100 |
| 2001/0036327 A1 | 11/2001 | Ishikawa et al. | |
| 2002/0185925 A1 | 12/2002 | Yoshikawa et al. | |
| 2004/0114840 A1 | 6/2004 | Gomyo | |
| 2005/0238267 A1 | 10/2005 | Nakamura et al. | |
| 2006/0251351 A1 | 11/2006 | Gomyo | |

FOREIGN PATENT DOCUMENTS

| | | |
|---|---|---|
| JP | 10-318253 A | 12/1998 |
| JP | 2001-263341 A | 9/2001 |
| JP | 2001-317545 A | 11/2001 |
| JP | 2003-336636 A | 11/2003 |
| JP | 2005-308186 A | 11/2005 |

OTHER PUBLICATIONS

International Search Report of PCT/JP2009/066115, date of mailing Dec. 8, 2009.

Chinese Office Action dated Nov. 2, 2012, issued in corresponding Chinese patent application No. 200980140515.9, w/ partial English translation.

* cited by examiner

FLUID DYNAMIC BEARING DEVICE

TECHNICAL FIELD

The present invention relates to a fluid dynamic bearing device.

BACKGROUND ART

A fluid dynamic bearing device is a bearing device which rotatably supports a shaft member with oil films formed in bearing gaps. The fluid bearing device has characteristics such as high-speed rotation operation, high rotational accuracy, and quietness. In recent years, by taking advantage of those characteristics, the fluid bearing device is suitably used as a bearing device for a motor to be mounted to various electrical apparatuses such as information apparatuses. Specifically, as a bearing device for a motor, the fluid bearing device has been suitably used in the following: a spindle motor for a magnetic disk drive such as an HDD, an optical disk drive for a CD-ROM, CD-R/RW, DVD-ROM/RAM, or the like; a polygon scanner motor of a laser beam printer (LBP); or a fan motor for a PC or the like.

The fluid dynamic bearing device mounted to the spindle motor among the above-mentioned motors includes a shaft member and fixation side members including a bearing sleeve having an inner periphery along which the shaft member is inserted. Examples of the shaft member used in many cases include one provided with a flange portion at one end of a shaft portion thereof. In those cases, a radial bearing gap of a radial bearing portion is formed between an outer peripheral surface of the shaft portion and a surface opposed thereto, and a thrust bearing gap of a thrust bearing portion is formed between an end surface of a flange portion and a surface opposed thereto (refer to Patent Document 1, for example).

As the shaft member provided with a flange, the following are used: one adopting an integrated type in which both the shaft portion and the flange portion are formed integrally with each other by machine work such as cutting; and one adopting a separate type in which the shaft portion and the flange portion separately prepared are integrated with each other by an appropriate means. Examples of the shaft member provided with a flange of the separate type include one in which the one end of the shaft portion is fixed by press-fitting into a through-hole provided at a center of the flange portion as described, for example, in JP 2001-317545 A (Patent Document 2).

Incidentally, during operation of the fluid dynamic bearing device of this type, pressure balance of a lubricating fluid such as a lubricating oil, which fills an inner space, may be disturbed. When the disturbance of the pressure balance occurs between a space defined by one end surface of the flange portion (first thrust bearing gap, for example) and a space defined by another end surface of the flange portion (second thrust bearing gap, for example), there arises a problem of deterioration in rotational accuracy in thrust directions. Problems of this type can be solved by providing a fluid path formed by opening both end surfaces of the flange portion so as to cause a lubricating oil to communicate between the above-mentioned two spaces through the fluid path.

RELATED ART DOCUMENTS

Patent Document 1: JP 2003-336636 A
Patent Document 2: JP 2001-317545 A

SUMMARY OF THE INVENTION

Problems to be Solved by the Invention

In order to provide a fluid dynamic bearing device excellent in rotational accuracy and reliability, it is important to sufficiently enhance the accuracy between the shaft portion and the flange portion (perpendicularity or the like) in advance. While the shaft member provided with a flange of the integrated type is capable of meeting the requirement at high level, it is necessary to establish a dedicated processing installation therefor, which requires tremendous manufacturing cost. Further, in order to provide the above-mentioned fluid path in the shaft member provided with a flange of the integrated type, it is necessary to form a through-hole in the flange portion by drilling separately effected, for example, after completion of the shaft member. However, leaving chips produced as a result of the drilling as they are may lead to a problem of contaminants, and hence it is necessary to prepare a washing step after the drilling so as to carefully remove the chips. Therefore, an additional increase in manufacturing cost is inevitable.

Meanwhile, the shaft member provided with a flange of the separate type can be inexpensively manufactured in comparison with that of the integrated type. By means of press-fitting as described in Patent Document 2, perpendicularity between the shaft portion and the flange portion after press-fitting is influenced by working accuracy of the surface subjected to press-fitting. Thus, at the time of fixing the shaft portion and the flange portion to each other, it is necessary to finish not only an outer peripheral surface of the shaft portion, which constitutes one of surfaces forming the radial bearing gap, but also an inner peripheral surface of the flange portion in advance with high accuracy, which leads to an increase in manufacturing cost.

The present invention has been made in view of the problems mentioned above, and it is therefore an object of the present invention to easily and inexpensively manufacture a shaft member provided with a flange, which is capable of stably yielding excellent bearing performance.

Means for Solving the Problems

In order to solve the above-mentioned problems, the present invention provides a fluid dynamic bearing device, including:

a shaft member having a shaft portion at one end of which a flange portion is provided;

a radial bearing gap formed with an outer peripheral surface of the shaft portion; and a thrust bearing gap formed with an end surface of the flange portion, in which:

a through-hole is provided in the flange portion;

the flange portion and the shaft portion are coupled in a state of butting an end surface of the flange portion and an end surface of the shaft portion against each other around the through-hole; and a fluid path is formed by opening both the end surface and another end surface of the flange portion through the through-hole. Note that, the "state of butting against each other" in this case represents a state of opposing the end surface of the flange portion and the end surface of the shaft portion to each other, and conceptually includes not only a state of holding the end surfaces in contact with each other but also a state in which the end surfaces are partially kept out of contact with each other.

According to the above-mentioned structure of the present invention, merely by providing the through-hole in the flange portion, specifically, merely by providing the through-hole around which the end surface of the shaft portion can be butted, and by coupling the flange portion and the shaft portion with each other in a state of butting the end surface of the shaft portion against the end surface of the flange portion, it is possible to form the fluid path. In the above-mentioned structure of the present invention, when the through-hole provided in the flange portion is formed to be larger in diameter, the fluid path is increased in diameter in accordance therewith. Therefore, it is possible to cause the lubricating fluid to flow into the fluid path more easily, and possible to reduce fluid resistance generated when the lubricating fluid flows in the fluid path. Accordingly, the lubricating fluid can be smoothly communicated between two spaces formed at both the ends of the flange portion. Even in the case where the disturbance of the pressure balance occurs in the lubricating fluid between the two spaces, it is possible to immediately solve the problem of the disturbance of the pressure balance.

Further, with the structure of the present invention, in which the shaft portion and the flange portion are coupled in the state of butting both the end surfaces thereof against each other, perpendicularity between the shaft portion and the flange portion can be controlled with jigs (dies) used at the time of coupling the shaft portion and the flange portion with each other. Thus, it is possible to reduce accuracy required for each of the shaft portion and the flange portion, and possible to inexpensively mass-produce shaft members of high accuracy.

The above-mentioned structure can be obtained by positioning a part of a circumferential region of the through-hole on the end surface of the flange portion on the radially outer side with respect to the end surface of the shaft portion coupled with the flange portion. Specifically, the above-mentioned structure can be obtained, for example, by forming the through-hole into a non-circular shape and forming at least the one end portion of the shaft portion, which is to be coupled with the flange portion, into a complete circular shape in cross section so as to be smaller in diameter than the maximum inner diameter of the through-hole, and by coupling the one end portion of the shaft portion with the flange portion after centering on the shaft portion and the flange portion is completed.

The through-hole to be provided in the flange portion can be formed by press working (punch working). With this, the through-hole having a predetermined shape can be inexpensively formed.

A coupling means for the shaft portion and the flange portion can be arbitrarily selected as long as the shaft portion and the flange portion can be coupled with each other with predetermined strength. Thus, it is possible to adopt various well-known means such as bonding, friction welding, and welding. In this context, it is suitable to adopt welding by which high coupling strength can be secured therebetween even when a coupling portion (coupling area) is minute, specifically, to adopt laser welding. That is, it is desirable that the butting portion between the end surface of the flange portion and the end surface of the shaft portion be subjected to laser welding. In this case, in order to prevent to the maximum extent a situation in which dissolved matters produced in accordance with application of a laser beam adhere to the outer peripheral surface of the shaft portion and the end surface of the flange portion, which form bearing gaps, it is desirable that a laser beam be applied from an opening portion on a side opposite to the shaft portion of the through-hole so as to couple the flange portion and the shaft portion with each other.

The fluid dynamic bearing device according to the present invention further includes:
an outer member opened at both axial ends thereof; and
a lid member closing an opening portion at one of the axial ends of the outer member, in which:
the outer member is provided with:
a bearing portion so that a radial bearing gap is formed between the outer member and an outer peripheral surface of the shaft member; and
a retaining portion for retaining the bearing portion, which comprises an attachment portion with respect to a motor base; and
the lid member is fixed to an outer peripheral surface of the outer member. In this structure, the outer member may be constituted by integrating the bearing portion and the retaining portion separately prepared with each other by an appropriate means. In terms of cost reduction, it is desirable that the outer member be formed by injection molding of the retaining portion while the bearing portion is inserted therein, or be integrated with the bearing portion and the retaining portion. Note that, in embodiments described below, a bearing sleeve 8 arranged on an outer periphery of a shaft member 2 and forming a radial bearing gap between the bearing sleeve 8 and an outer peripheral surface 2a1 of the shaft member 2 corresponds to the "bearing portion", and the housing 9 retaining the bearing sleeve 8 on an inner periphery thereof corresponds to the "retaining portion."

Note that, in the case of using the outer member constituted by integrating the bearing portion and the retaining portion separately prepared with each other by an appropriate means as illustrated, for example, in FIG. 10, it is possible to form a fluid path between the inner peripheral surface of the retaining portion and the outer peripheral surface of the bearing portion. Meanwhile, in the case where the outer member is formed by injection molding of the retaining portion while the bearing portion is inserted therein as illustrated in FIGS. 2 and 8, or in the case where the outer member is integrated with the bearing portion and the retaining portion as illustrated in FIG. 9, it is difficult to form the fluid path of this type. Thus, in the case of adopting the structure of the bearing device described above, it is especially effective to apply the above-mentioned structure of the present invention, in which the fluid path formed by opening both the end surfaces thereof is provided to the flange portion.

Incidentally, when the lid member is fixed to the outer peripheral surface of the retaining portion in the above-mentioned structure, in comparison with the case of fixing the lid member to the inner peripheral surface of the retaining portion (housing) as described in Patent Document 1 mentioned above, it is possible to increase a fixation area correspondingly to difference in diameter between the inner peripheral surface and the outer peripheral surface. In the case of fixing the lid member to the outer peripheral surface of the retaining portion, it is necessary to provide a disk-like portion closing the opening portion at the one of the axial ends of the retaining portion (outer member) and a cylindrical portion fixed to the outer peripheral surface. The fixation area with respect to the retaining portion is increased merely by increasing an axial dimension of the cylindrical portion. Thus, it is unnecessary to increase the thickness of the lid member. In addition, even when the cylindrical portion is elongated, a dimension of the entire length of the bearing device is not influenced. With this, it is possible to increase detachment resistance of the lid member without influence on the axial dimension of the bearing device or a bearing span between the radial bearing portions, and hence possible to stably maintain predetermined bearing performance.

Further, with the above-mentioned structure, the lid member fixed to the outer peripheral surface of the retaining portion can be utilized as an attachment portion to the motor base. While it is effective to form the retaining portion by injection molding of a resin in terms of cost, it is difficult in this case to secure fixation strength required in the case of bonding and fixing the retaining portion to the motor base generally made of metal. Meanwhile, the fixation strength can be satisfied when the retaining portion is made of metal, which involves an increase in cost in comparison with the case of resin. In this context, with the above-mentioned structure, it is possible to meet the requirement of cost reduction by forming the retaining portion with a resin while satisfying the fixation strength of the fluid dynamic bearing device with respect to the motor base by forming the lid member with a metal material excellent in bonding property with respect to the lid member.

The fluid dynamic bearing device according to the present invention has the above-mentioned features, and hence can be suitably used while being incorporated in a motor including a stator coil and a rotor magnet, for example, in a spindle motor for a disk drive.

Effects of the Invention

As has been described above, according to the present invention, it is possible to easily and inexpensively manufacture a shaft member provided with a flange, which is capable of stably yielding excellent bearing performance. With this, it is possible to inexpensively provide a fluid dynamic bearing device excellent in bearing performance.

BEST MODES FOR CARRYING OUT THE INVENTION

In the following, embodiments of the present invention are described with reference to drawings.

Figure 1:
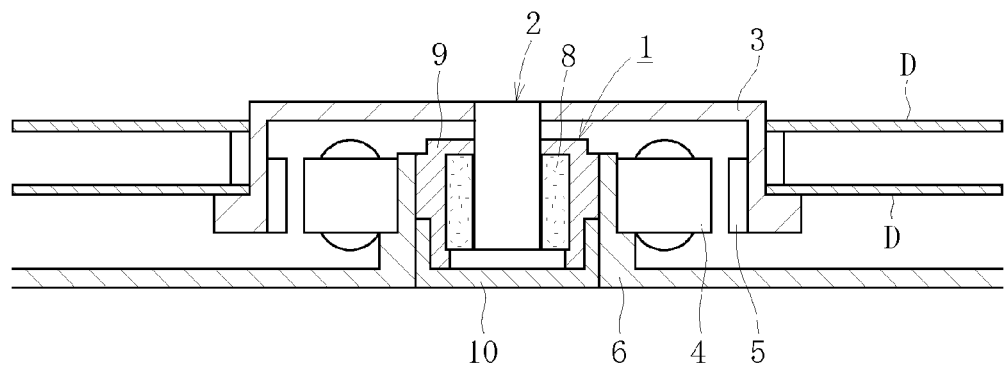
FIG. 1 is a sectional view conceptually illustrating an example of a spindle motor for an information apparatus, which incorporates a fluid dynamic bearing device.

FIG. 1 conceptually illustrates a structural example of a spindle motor for an information apparatus, which incorporates a fluid dynamic bearing device. The spindle motor is used for a disk drive such as an HDD and includes a fluid dynamic bearing device 1 for rotatably supporting a shaft member 2, a disk hub 3 fixed to the shaft member 2, a stator coil 4 and a rotor magnet 5 which are opposed to each other through an intermediation of, for example, a gap in a radial direction, and a motor base 6. The stator coil 4 is attached to an outer periphery of the motor base 6 and the rotor magnet 5 is attached to an inner periphery of the disk hub 3. A housing 9 of the fluid dynamic bearing device 1 is fixed to an inner periphery of the motor base 6. One or a plurality of disks (two in illustration) D such as magnetic disks are held by the disk hub 3, and the disks D are fixed to the disk hub 3 by a clamping mechanism (not shown). With this configuration, when the stator coil 4 is energized, the rotor magnet 5 is rotated by an electromagnetic force between the stator coil 4 and the rotor magnet 5. With this, the disk hub 3 and the disks D held by the disk hub 3 are rotated integrally with the shaft member 2.

Figure 2:
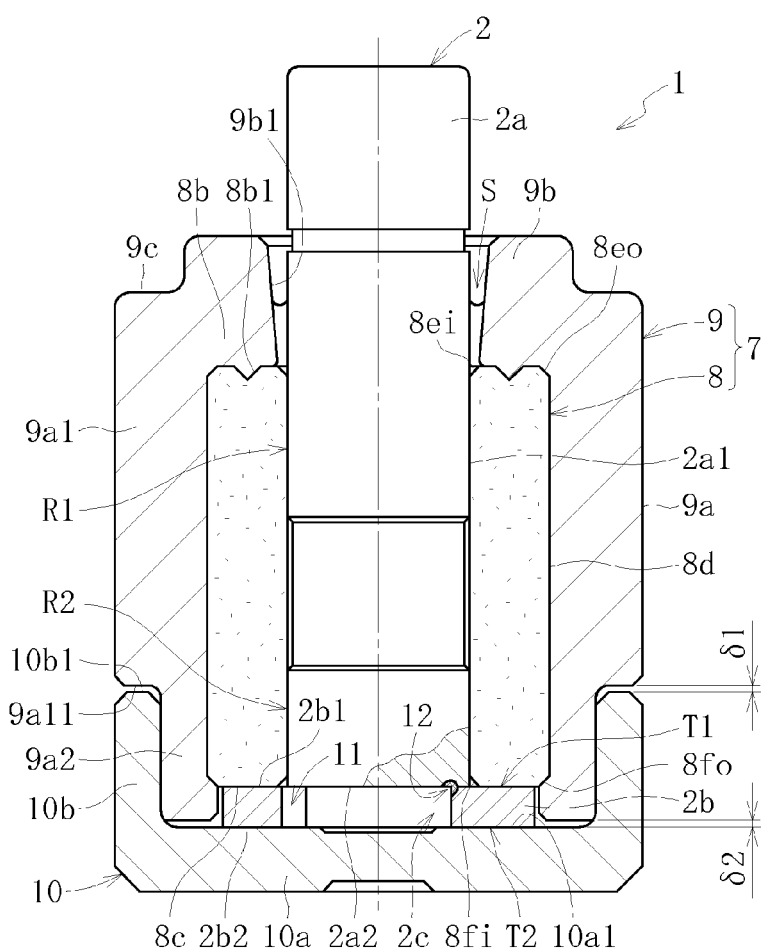
FIG. 2 is a sectional view of a fluid dynamic bearing device according to a first embodiment of the present invention.

FIG. 2 illustrates the fluid dynamic bearing device 1 according to a first embodiment of the present invention. The fluid dynamic bearing device 1 includes, as components, the shaft member 2, an outer member 7 arranged on an outer periphery of the shaft member 2 and opened at both axial ends thereof, and a lid member 10 closing the opening at one end of the outer member 7. The outer member 7 is constituted by a bearing sleeve 8 corresponding to a bearing portion, and the housing 9 corresponding to a retaining portion for retaining the bearing sleeve 8 on an inner periphery thereof. Note that, for the sake of convenience, description in the following is made on the assumption that a side on which the lid member 10 is provided is a lower side and a side axially opposite thereto is an upper side.

The bearing sleeve 8 is cylindrically formed of a porous body made of a sintered metal, in particular, a porous body made of a sintered metal including copper as a main component. The bearing sleeve 8 may be formed of a porous body other than the sintered metal, for example, of a porous resin or ceramics, or may be formed of a soft metal such as brass. Both an inner peripheral surface 8a and an outer peripheral surface 8d of the bearing sleeve 8 are formed into a shape of radially uniform cylindrical surface. Further, on inner peripheral edges and outer peripheral edges on both axial ends of the bearing sleeve 8, there are formed chamfers 8ei, 8eo, 8fi, and 8fo, respectively.

Figure 3:
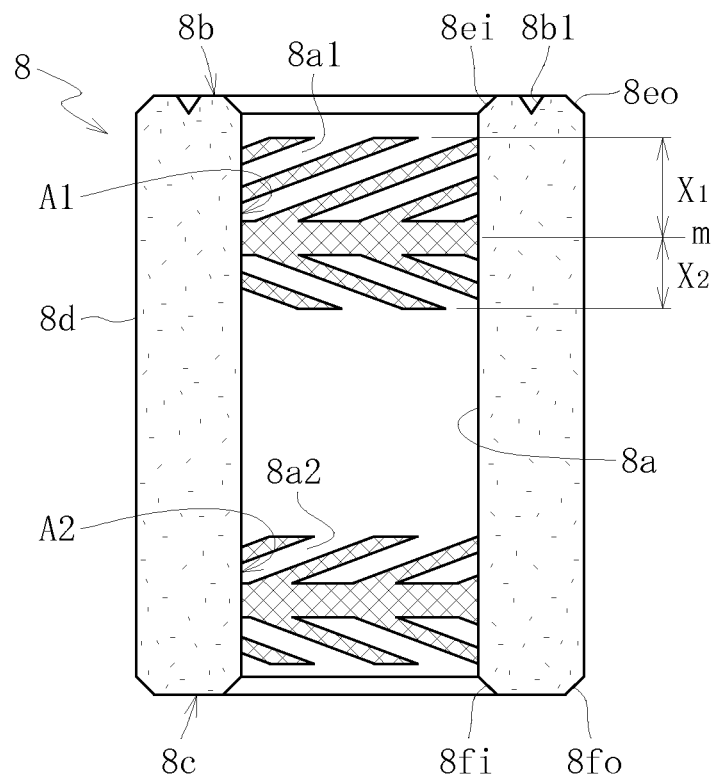
FIG. 3 is a sectional view of a bearing sleeve.

As illustrated in FIG. 3, on the inner peripheral surface 8a of the bearing sleeve 8, cylindrical radial bearing surfaces A1 and A2 are formed separately from each other at two portions in the axial direction so that a radial bearing gap is formed between the inner peripheral surface 8a of the bearing sleeve 8 and an outer peripheral surface 2a1 of a shaft portion 2a opposed thereto. In the radial bearing surfaces A1 and A2, there are formed radial dynamic pressure generating portions constituted by a plurality of dynamic pressure grooves 8a1 and 8a2 arranged in a herringbone pattern. In this embodiment, upper dynamic pressure grooves 8a1 are formed asymmetrically with each other in the axial direction with respect to an axial center m (axial center of a region between the upper and lower inclined grooves), and an axial dimension X1 of an upper region with respect to the axial center m is larger than an axial dimension X2 of a lower region. Meanwhile, the lower dynamic pressure grooves 8a2 are formed symmetrically with each other in the axial direction, and axial dimensions of the upper and lower regions are equal to the axial dimension X2 described above, respectively. Note that, the radial dynamic pressure generating portions may be formed on the outer peripheral surface 2a1 of the shaft portion 2a opposed thereto, or may be constituted by a plurality of dynamic pressure grooves arranged in a spiral pattern or the like.

Figure 4:
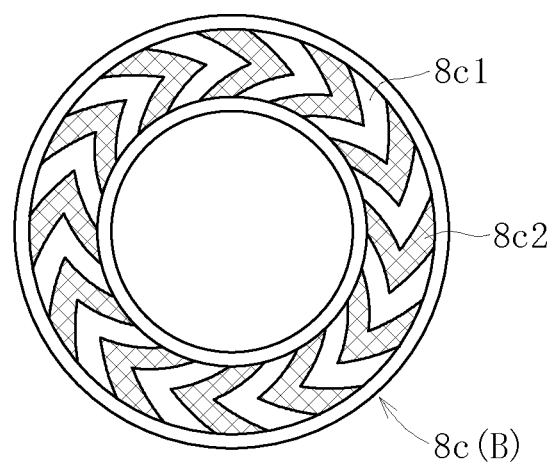
FIG. 4 illustrates a lower end surface of the bearing sleeve.

As illustrated in FIG. 4, on a lower end surface 8c of the bearing sleeve 8, a thrust bearing surface B is provided so that a first thrust bearing gap is formed between the lower end surface 8c of the bearing sleeve 8 and an upper end surface 2b1 of a flange portion 2b opposed thereto. On the thrust bearing surface B, there is formed a thrust dynamic pressure generating portion for generating a dynamic pressure effect in the first thrust bearing gap. The thrust dynamic pressure generating portion is constituted by dynamic pressure grooves 8c1 bent in a V-shape and hill portions 8c2 for partitioning the dynamic pressure grooves 8c1 alternately arranged in a circumferential direction, and exhibits a herringbone shape as a whole. Note that, the thrust dynamic pressure generating portion may be formed on the upper end surface 2b1 of the flange portion 2b opposed thereto.

The housing 9 is opened at both the axial ends so as to exhibit a substantially cylindrical shape, and integrally includes a main body portion 9a having an inner periphery on which the bearing sleeve 8 is retained, and a seal portion 9b provided on a radially inner side of an upper end of the main body portion 9a. An inner peripheral surface of the main body portion 9a is formed into a shape of radially uniform cylindrical surface, and an outer peripheral surface thereof is formed into a shape of stepped cylindrical surface radially small on the lower side. Accordingly, the main body portion 9a exhibits a mode in which a thick portion 9a1 formed to be relatively thicker and a thin portion 9a2 formed to be relatively thinner are stacked on each other in the axial direction. Note that, as described later, in this embodiment, an outer peripheral surface of the thick portion 9a1 of the housing 9 functions as an attachment portion with respect to the motor base 6.

An inner peripheral surface 9b1 of the seal portion 9b is formed into a shape of a tapered surface gradually reduced downward in diameter, and a wedge-like seal space S gradually reduced downward in radial dimension is formed between the inner peripheral surface 9b1 of the seal portion 9b and the outer peripheral surface 2a1 of the shaft portion 2a opposed thereto.

The housing 9 structured as described above is formed by die molding (injection molding) of a resin material while the bearing sleeve 8 is used as an inserted component. The resin material used for molding of the housing 9 is not particularly limited as long as injection molding can be effected. As a base resin, any of the following may be used: a liquid crystal polymer (LCP); a crystalline resin typified by polyphenylene sulfide (PPS); and an amorphous resin such as polyphenylsulfone (PPSU) or polyethersulfone (PES). Note that, while various fillers may be mixed with the resin material in accordance with required characteristics, as described later, conductivity is secured in the lid member 10 in this embodiment. Thus, it is unnecessary to mix a filler (conductive filler) for imparting conductivity to a resin material for molding. Note that, the conductive filler may be mixed as long as moldability or the like of the housing 9 is not adversely affected and there is no problem in terms of cost.

As a result of insertion molding of the housing 9, an upper end surface 8b of the bearing sleeve 8 and the outer peripheral chamfer 8eo are collectively covered with a resin. In addition, as illustrated in FIG. 2, when at least the outer peripheral chamfer 8fo at the lower end of the bearing sleeve 8 is covered with a resin, retention with respect to the housing 9 can be effected on the bearing sleeve 8. The inner peripheral chamfer 8ei at the upper end of the bearing sleeve 8 is not covered with a resin such that positioning of the bearing sleeve 8 is effected in a die by bringing the inner peripheral chamfer 8ei into contact with the die at the time of injection molding.

On a radially outer side of the upper end of the housing 9, which constitutes a boundary between the main body portion 9a and the seal portion 9b, corner portions are chamfered. Owing to a chamfered portion 9c thus formed, thickness of the housing 9 is substantially uniformed over the region from the main body portion 9a to the seal portion 9b. Thus, deformation of the inner peripheral surface 9b1 of the seal portion 9b, which is caused by molding shrinkage after injection molding, is suppressed, with the result that shape accuracy of the seal space S is secured.

Note that, while a resin material is used as a material for molding of the housing 9 in this embodiment, this should not be construed restrictively. For example, low melting metal materials such as a magnesium alloy or an aluminum alloy may be used.

The lid member 10 is fixed, for example, by gap-filling bonding to an outer peripheral surface of the thin portion 9a2 constituting the housing 9 (main body portion 9a). With this, the lower end opening of the housing 9 is closed. The lid member 10 is formed of a conductive metal material, and is formed, for example, through press working of a metal plate into a bottomed cylindrical shape (cup shape) in which plate portion 10a having a substantially disk-like shape and a cylindrical portion 10b having a shape of a cylinder extending upward from the radially outer end of the plate portion 10a are integrated with each other. The cylindrical portion 10b is overlapped with a part or the entire of the radial bearing surface A2 of the bearing sleeve 8 (partially in this embodiment) in the axial direction.

Figure 5:
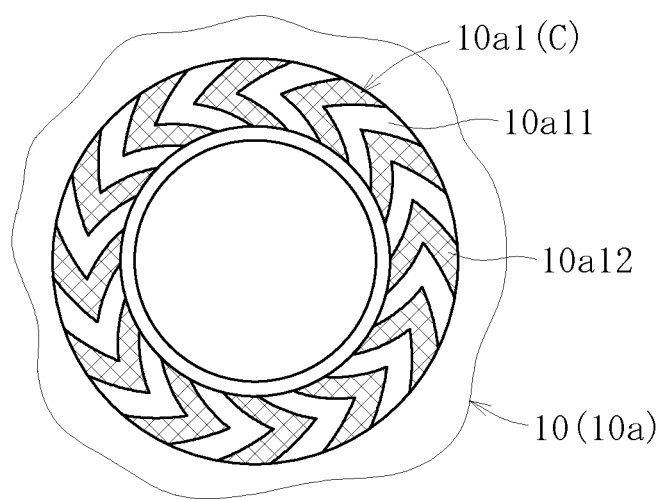
FIG. 5 illustrates an upper end surface of a lid member.

As illustrated in FIG. 5, on an upper end surface 10a1 of the plate portion 10a, a thrust bearing surface C is provided so that a second thrust bearing gap is formed between the upper end surface 10a1 of the plate portion 10a and a lower end surface 2b2 of the flange portion 2b opposed thereto. On the thrust bearing surface C, there is formed a thrust dynamic pressure generating portion for generating a dynamic pressure effect in the second thrust bearing gap. The thrust dynamic pressure generating portion is constituted by dynamic pressure grooves 10a11 bent in a V-shape and hill portions 10a12 for partitioning the dynamic pressure grooves 10a11 alternately arranged in a circumferential direction, and exhibits a herringbone shape as a whole. The thrust dynamic pressure generating portion may be formed on the lower end surface 2b2 of the flange portion 2b opposed thereto.

An upper end surface 10b1 of the cylindrical portion 10b of the lid member 10 and a lower end surface 9a11 of the thick portion 9a1 of the housing 9 are opposed to each other in the axial direction. After setting of a width of the thrust bearing gap described later, an axial gap $\delta 1$ is formed between both the surfaces 10b1 and 9a11. After the setting of the width of the thrust bearing gap, the axial gap $\delta 1$ may be completely sealed, for example, by adhesive. Further, an axial gap $\delta 2$ is formed between the upper end surface 10a1 of the plate portion 10a and the lower end surface of the thin portion 9a2 of the housing 9. It is desirable that a gap width of the axial gap $\delta 2$ be as small as possible so as to reduce a retaining amount of oil in the bearing device.

The shaft member 2 is constituted by the shaft portion 2a and the flange portion 2b protruding on the radially outer side from the lower end of the shaft portion 2a. The shaft portion 2a is formed of a metal material excellent in rigidity and abrasion resistance, and in this embodiment, formed of a stainless steel as a solid shaft over the entire length so as to have a complete circular shape in cross section. The outer peripheral surface 2a1 of the shaft portion 2a is formed into a shape of a radially uniform cylindrical surface except an axial region provided with a cylindrical recessed portion retracted to a radially inner side. Further, a lower end surface 2a2 of the shaft portion 2a is formed as a smooth flat surface free from asperity. Meanwhile, the flange portion 2b is formed of a stainless steel similarly to the shaft portion 2a so as to have an annular shape in which a through-hole 2c is formed. Both the end surfaces 2b1 and 2b2 of the flange portion 2b are formed as smooth flat surfaces free from asperity.

In a state of butting the lower end surface 2a2 of the shaft portion 2a and the upper end surface 2b1 of the flange portion 2b against each other, the shaft member 2 is integrated in a coupling manner through an intermediation of a coupling portion 12 formed on an inner periphery of the flange portion 2b, more specifically, formed on the inner periphery of an upper end of the flange portion 2b. Further, the flange portion 2b is provided with a fluid path 11 formed by opening both the end surfaces 2b1 and 2b2. The fluid path 11 is formed by opening both the end surfaces 2b1 and 2b2 through the through-hole 2c of the flange portion 2b. A manufacturing method for the shaft member 2 is described later.

The fluid dynamic bearing device 1 described above is incorporated into a motor, for example, by bonding and fixing an outer peripheral surface of the lid member 10 (cylindrical portion 10b) and an outer peripheral surface of the housing 9 to an inner peripheral surface of the motor base 6 (refer to FIG. 1) formed of a metal material such as an aluminum alloy. In this case, when outer diameter dimensions of the housing 9 and the lid member 10 are equal to each other, those outer peripheral surfaces can be reliably fixed to the inner peripheral surface of the motor base 6. Further, in this case, when the inner peripheral surface of the motor base 6 is formed to be somewhat radially larger than the outer peripheral surface of the housing 9, the motor base 6 and the housing 9 can be bonded and fixed with adhesive filling a radial gap formed therebetween (gap-filling bonding). In addition, both the lid member 10 and the motor base 6 are made of metal, and hence the fluid dynamic bearing device 1 can be fixed to the motor base 6 with high bonding strength. Note that, when sufficient bonding strength can be secured between the lid member 10 and the motor base 6, it is not necessary to bond and fix the housing 9 to the motor base 6.

When the shaft member 2 is rotated in the fluid dynamic bearing device 1 structured as described above, the radial bearing gaps are formed between the radial bearing surfaces A1 and A2 of the bearing sleeve 8 and the outer peripheral surface 2a1 of the shaft portion 2a opposed thereto. In accordance with the rotation of the shaft member 2, oil-film pressure in both the radial bearing gaps is increased by dynamic pressure effects of the dynamic pressure grooves 8a1 and 8a2. As a result, radial bearing portions R1 and R2 for supporting the shaft member 2 in the radial direction in a non-contact manner are formed separately from each other at two portions in the axial direction. Simultaneously, the first and second thrust bearing gaps are respectively formed between the thrust bearing surface B provided on the lower end surface 8c of the bearing sleeve 8 and the upper end surface 2b1 of the flange portion 2b and between the lower end surface 2b2 of the flange portion 2b and the thrust bearing surface C provided on the upper end surface 10a1 of the lid member 10. In accordance with the rotation of the shaft member 2, oil-film pressure in both the thrust bearing gaps is increased by dynamic pressure effects of the dynamic pressure grooves 8c1 and 10a11. As a result, there are formed first and second thrust bearing portions T1 and T2 for supporting the shaft member 2 in both the thrust directions in a non-contact manner.

Further, the seal space S is gradually reduced downward (inner side of the housing 9) in radial dimension so as to exhibit a wedge-like shape. Therefore, a lubricating oil in the seal space S is drawn-in toward the inner side of the housing 9 owing to a drawing-in effect exerted by a capillary force. Further, the seal space S has a buffering function of absorbing an amount of change in volume due to change in temperature of the lubricant oil filling the inner space of the housing 9, and an oil level of the lubricating oil is constantly maintained within the seal space S within an anticipated range of change in temperature. The above-mentioned structure allows effective prevention of leakage of the lubricating oil from the inside of the housing 9.

Incidentally, in this embodiment, in the dynamic pressure grooves 8a1 provided in the radial bearing surface A1 of the bearing sleeve 8, the axial dimension X1 of the upper region with respect to the axial center m is larger than the axial dimension X2 of the lower region. Therefore, when the shaft member 2 is rotated, a drawing-in force of the lubricating oil, which is exerted by the dynamic pressure grooves 8a1, is relatively larger in the upper region in comparison with that in the lower region. Owing to differential pressure of the drawing-in force (imbalance of pumping capacity), the lubricating oil filling the gap between the inner peripheral surface 8a of the bearing sleeve 8 and the outer peripheral surface 2a1 of the shaft portion 2a is pressed downward. In this case, pressure becomes higher in a space on the closed side in the bearing, in particular, in a space on the radially inner side of the second thrust bearing gap, and hence an excessive upward floating force acts on the shaft member 2. As a result, it becomes difficult to maintain balance of a thrust supporting force between both the thrust bearing portions T1 and T2.

In this regard, in the fluid dynamic bearing device 1 according to this embodiment, the fluid path 11 formed by opening both the end surfaces 2b1 and 2b2 is provided in the flange portion 2b, and hence the lubricating oil can be communicated between both the thrust bearing gaps through the fluid path 11. Thus, it is possible to solve a problem of impaired pressure balance between both the thrust bearing gaps at an early stage so as to maintain the balance of a thrust supporting force between both the thrust bearing portions T1 and T2, that is, to stabilize rotational accuracy in the thrust directions.

Further, as described above, in the fluid dynamic bearing device 1 according to this embodiment, there is a tendency that the pressure in the space on the radially inner side of the second thrust bearing gap is increased. In this case, when the dynamic pressure grooves 10a11 constituting the second thrust bearing portion T2 are arranged in a spiral pattern of a pump-in type, which have been conventionally used in many cases, the lubricating oil filling the second thrust bearing gap is pressed into the radially inner side. As a result, an increase in pressure is promoted in the space on the radially inner side in the second thrust bearing gap. In this context, it is desirable that the dynamic pressure grooves 10a11 constituting the second thrust bearing portion T2 be formed in a herringbone pattern as illustrated in FIG. 5 because this problem can be avoided. Meanwhile, problems of this type do not arise in the first thrust bearing portion T1, and hence the dynamic pressure grooves 8c1 may be formed in the spiral pattern of the pump-in type instead of the herringbone pattern as illustrated in FIG. 4.

Next, detailed description is made on a manufacturing method for the shaft member 2 described above.

Figure 6A:
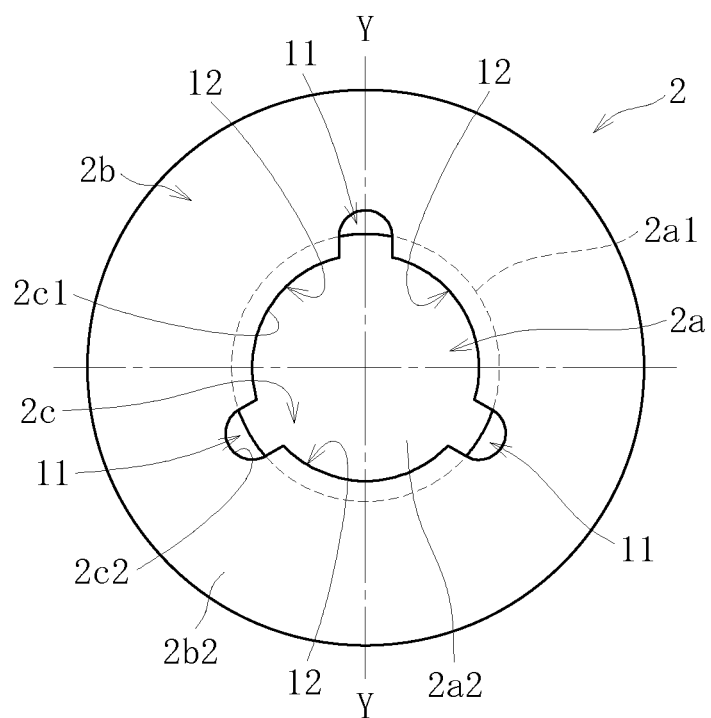
FIG. 6A is a plan view seen from a lower side of the shaft member.

First, the flange portion 2b having the through-hole 2c is prepared. The through-hole 2c is formed so that a part of a circumferential region thereof is opened on the upper end surface 2b1 of the flange portion 2b on a radially outer side with respect to the lower end portion (lower end surface 2a2) of the shaft portion 2a, which is coupled with the flange portion 2b. Specifically, as illustrated in FIG. 6A, the through-hole 2c in this embodiment is formed into a non-circular shape in which the following are alternately arranged in the circumferential direction: three first circular-arc surfaces 2c1 each having a circular-arc shape and positioned on the radially inner side with respect to the outer peripheral surface 2a1 of the shaft portion 2a after centering on the shaft portion 2a and the flange portion 2b is completed; and three second circular-arc surfaces 2c2 each having a substantially semicircular shape and having a radially outer region which is partially positioned on the radially outer side with respect to the outer peripheral surface 2a1 of the shaft portion 2a after centering on the shaft portion 2a and the flange portion 2b is completed as well. The through-hole 2c having a non-circular shape as described above can be formed by effecting press working (punch working) on the flange portion 2b formed into a disk-like shape. By means of press working, the through-hole 2c having a complicated shape of this type can be formed inexpensively with high accuracy.

Figure 7A:
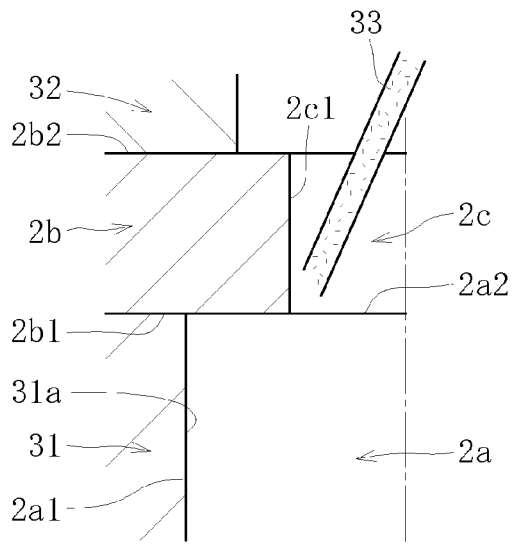
FIG. 7A is a partially enlarged sectional view schematically illustrating a welding step of a flange portion.

Next, the flange portion 2b structured as described above and the shaft portion 2a separately prepared are coupled integrally with each other after centering thereon is completed. Specifically, first, as schematically illustrated in FIG. 7A, the shaft portion 2a is inserted along an inner periphery of a lower die 31 and the outer peripheral surface 2a1 of the shaft portion 2a is held, and then the upper end surface 2b1 of the flange portion 2b is butted against the lower end surface 2a2 of the shaft portion 2a. In this embodiment, the flange portion 2b is placed on the shaft portion 2a (and lower die 31) in a manner that both the end surfaces 2b1 and 2a2 are brought into contact with each other. Next, while effecting centering on the shaft portion 2a and the flange portion 2b, both the end surfaces 2b1 and 2b2 of the flange portion 2b are held by the lower die 31 and an upper die 32. Note that, while not shown, in order to easily effect centering on the shaft portion 2a and the flange portion 2b with high accuracy, it is desirable to hold the outer peripheral surface of the flange portion 2b.

Figure 6B:
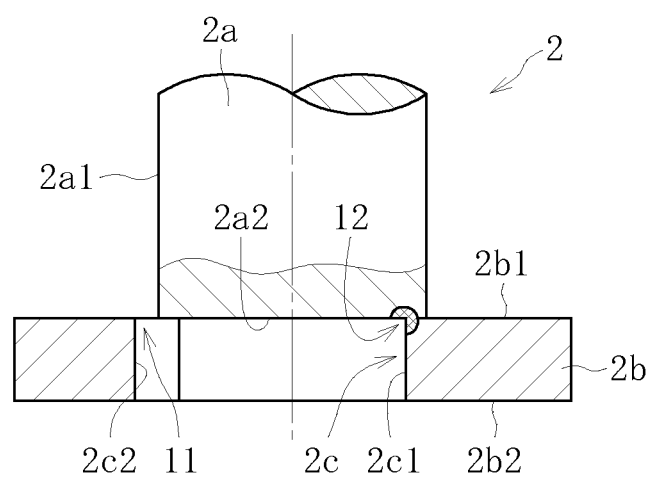
FIG. 6B is a sectional view taken along the line Y-Y of FIG. 6A.

In this case, on the premise that the through-hole 2c in the above-mentioned mode is formed in the flange portion 2b, when centering is effected in a state of butting the shaft portion 2a and the flange portion 2b against each other, circumferential regions in the upper end surface 2b1 of the flange portion 2b, in which the first circular-arc surfaces 2c1 are provided, are overlapped with the lower end surface 2a2 of the shaft portion 2a in the radial direction. Meanwhile, circumferential regions in the upper end surface 2b1 of the flange portion 2b, in which the second circular-arc surfaces 2c2 are provided, are not overlapped with the lower end surface 2a2 of the shaft portion 2a (refer to FIGS. 6A and 6B).

Figure 7B:
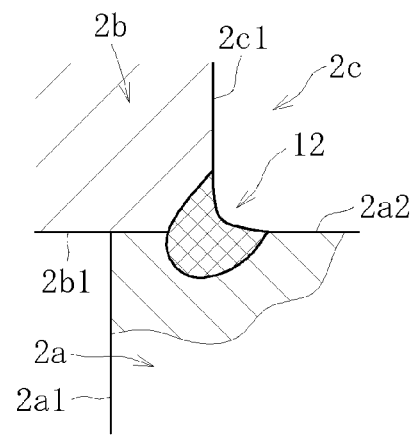
FIG. 7B is a partially enlarged sectional view schematically illustrating the welding step of the flange portion.

Then, in a manner of passing a through-hole of the upper die 32 and the through-hole 2c of the flange portion 2b from the lower end surface 2b2 side of the flange portion 2b, a laser beam 33 is applied from a laser beam applying device (not shown) onto the upper end inner periphery of the flange portion 2b, more specifically, onto the regions in the flange portion 2b, in which the first circular-arc surfaces 2c1 overlapped with the lower end surface 2a2 of the shaft portion 2a in the radial direction are formed. When the laser beam 33 is applied, an edge portion on the upper end inner periphery of the flange portion 2b and the lower end of the shaft portion 2a adjacent thereto are fused with each other. As a result, as illustrated in FIG. 7B, the coupling portion 12 is formed by fixing the flange portion 2b and the shaft portion 2a through welding. Similarly, the coupling portion 12 is formed in a circumferential predetermined region (part or the entire of the region in which lower end surface 2a2 of shaft portion 2a and upper end surface 2b1 of flange portion 2b are overlapped with each other, that is, part or the entire of the region in which the first circular-arc surfaces 2c1 are formed). Simultaneously when the formation of the coupling portion 12 is completed, an upper end opening portion of the fluid path 11 defined by the through-hole 2c of the flange portion 2b and the lower end of the shaft portion 2a, more specifically, by the second circular-arc surfaces 2c2 of the flange portion 2b and the lower end portion of the shaft portion 2a, and a lower end opening portion of the fluid path 11 is defined by a lower end opening portion of the through-hole 2c.

Note that, examples of the usable laser beam 33 used for formation of the coupling portion 12 include well-known laser beams of various types, such as a YAG laser beam, a carbon dioxide laser beam, a semiconductor laser beam, or a fiber laser beam. Of those, the YAG laser beam and the carbon dioxide laser beam are suitable in consideration of economy, welding strength, easiness of welding, or the like. Further, the laser beam 33 may be applied in any of a continuous mode and a pulse mode.

As has been described above, in the fluid dynamic bearing device 1 of the present invention, merely by providing the through-hole 2c in the flange portion 2b, specifically, merely by providing the through-hole 2c having a non-circular shape so that a part of the circumferential region thereof is positioned on the upper end surface 2b1 of the flange portion 2b on the radially outer side with respect to the lower end surface 2a2 of the shaft portion 2a coupled with the flange portion 2b, and by coupling the flange portion 2b and the shaft portion 2a with each other in a state of butting the lower end surface 2a2 of the shaft portion 2a against the upper end surface 2b1 of the flange portion 2b, it is possible to form the fluid path 11 while opening both the end surfaces 2b1 and 2b2 of the flange portion 2b. In this structure, the lower end opening portion of the opening portion at both the ends of the fluid path 11 is constituted by the lower end opening portion of the through-hole 2c provided in the flange portion 2b. Thus, when the through-hole 2c provided in the flange portion 2b is formed to be larger in diameter, the lower end opening portion of the fluid path 11 is also increased in diameter. Therefore, in particular, it is possible to cause the lubricating oil filling the gap (second thrust bearing gap) formed between the lower end surface 2b2 of the flange portion 2b and the upper end surface 10a1 of the lid member 10 to flow into the fluid path 11 more easily, and possible to reduce fluid resistance generated when the lubricating oil flows in the fluid path 11. Accordingly, even in the structure of this embodiment, in which pressure is liable to become higher in the space on the radially inner side of the second thrust bearing gap, the lubricating oil can be smoothly communicated through the fluid path 11 between both the thrust bearing gaps. With this, it is possible to immediately solve the problem of impaired pressure balance between both the thrust bearing gaps, and possible to stabilize rotational accuracy in the thrust directions at an earlier stage.

Further, with the structure of the present invention, in which the shaft portion 2a and the flange portion 2b are coupled in a state of the surfaces thereof being butted against each other, perpendicularity between the shaft portion 2a and the flange portion 2b can be controlled with the dies 31 and 32 used at the time of coupling. Thus, it is possible to reduce accuracy required for each of the shaft portion 2a and the flange portion 2b, and possible to inexpensively mass-produce shaft members 2 of high accuracy.

Further, regarding the disk hub 3 (refer to FIG. 1) fixed to the upper end of the shaft portion 2a at the time of assembly of a motor, deficiency in coupling strength may lead to a risk that the shaft portion 2a and the flange portion 2b are separated from each other owing to pressure applied at the time of fixation of the disk hub 3. As in the case of the present invention, when the shaft portion 2a and the flange portion 2b are coupled in a state of butting both the end surfaces thereof against each other, the pressure applied at the time of fixation of the disk hub 3 is cancelled through engagement of the lower end surface 2a2 of the shaft portion 2a with the upper end surface 2b1 of the flange portion 2b in the axial direction. Therefore, it is possible to effectively prevent the above-mentioned failures.

Further, the shaft portion 2a and the flange portion 2b are coupled integrally with each other by applying the laser beam 33 (laser welding). Thus, even in the structure of this embodiment, in which a contact area between the shaft portion 2a and the flange portion 2b is relatively smaller, it is possible to secure high coupling strength therebetween. Further, at the time of subjecting the shaft portion 2a and the flange portion 2b to laser welding, the coupling portion 12 is formed on the inner periphery of the upper end of the flange portion 2b by applying the laser beam 33 from the lower end surface 2b2 side of the flange portion 2b. Thus, it is possible to effectively prevent a situation in which dissolved matters such as metal particles produced at the time of welding adhere to the outer peripheral surface 2a1 of the shaft portion 2a and the end surfaces 2b1 and 2b2 of the flange portion 2b, which form bearing gaps, and bearing performance is deteriorated.

Description is hereinabove made on the case where the shaft portion 2a and the flange portion 2b are coupled integrally with each other in a state of holding the lower end surface 2a2 of the shaft portion 2a and the upper end surface 2b1 of the flange portion 2b in contact with each other. With laser welding, even in the case where the lower end surface 2a2 and the upper end surface 2b1 are partially butted against (opposed to) each other in a non-contact state, it is possible to couple the shaft portion 2a and the flange portion 2b with each other with high accuracy and high strength. As described above, when the shaft portion 2a and the flange portion 2b are coupled with each other in a state of holding the lower end surface 2a2 of the shaft portion 2a and the upper end surface 2b1 of the flange portion 2b in contact with each other in the non-contact state, it is possible to further reduce the accuracy required for each of the shaft portion 2a and the flange portion 2b, and possible to further reduce the manufacturing cost of the shaft member 2.

Further, while both the shaft portion 2a and the flange portion 2b are made of stainless steel in this embodiment, high fastening strength can be secured even between different metals by means of laser welding. Thus, as long as the strength required for the shaft member 2 can be secured, the shaft portion 2a and the flange portion 2b may be made of materials different from each other. For example, while the shaft portion 2a may be made of stainless steel, the flange portion 2b may be made of copper or the like, and cost reduction of the shaft member 2 can be achieved.

Note that, description is hereinabove made on the case where the shaft portion 2a and the flange portion 2b are coupled integrally with each other by laser welding in which the laser beam 33 is applied. As long as predetermined coupling strength can be secured between the shaft portion 2a and the flange portion 2b, a coupling method therebetween may be arbitrarily selected. For example, the lower end surface 2a2 of the shaft portion 2a and the upper end surface 2b1 of the flange portion 2b opposed to each other may be integrated with each other by interposing adhesive therebetween, or may be coupled integrally with each other by friction welding or brazing and soldering.

In addition, in the fluid dynamic bearing device 1 of this embodiment, the lid member 10 is fixed to the outer peripheral surface of the housing 9 (outer member 7). Thus, in comparison with the case where the lid member is fixed to the inner peripheral surface of the housing as described in Patent Document 1, it is possible to increase a fixation area between the lid member 10 and the housing 9 correspondingly to difference in diameter between the inner peripheral surface and the outer peripheral surface. Further, by reducing an axial dimension of the thick portion 9a1 of the housing 9, it is possible to increase an axial dimension of the cylindrical portion 10b of the lid member 10, and hence possible to easily achieve a further increase in the fixation area, that is, enhancement of the fixation strength. In addition, it is unnecessary to increase the thickness of the lid member 10 in accordance therewith. Accordingly, detachment resistance of the lid member 10 can be increased without influence on the axial dimension of the fluid dynamic bearing device 1 and a bearing span between the radial bearing portions R1 and R2. With this, reliability of the fluid dynamic bearing device 1 is increased.

Further, the lid member 10 is made of metal material, and hence static electricity charged in accordance with the rotation of the disks D can be reliably discharged to the ground side through a path constituted by the shaft member 2, the lid member 10, and the motor base 6. Note that, in the case of bonding and fixing the lid member 10 and the motor base 6 to each other, there is a risk that the conductive path may be blocked by adhesive (normally, an insulant). In such a case, it is desirable to apply a suitable conductive material when necessary so as to form a conductive film over the radially-outer lower end of the lid member 10 and the radially-inner lower end of the base 6.

When the conductive path is constituted by the lid member 10 as described above, it is unnecessary to take conductivity of the housing 9 into consideration. Thus, more alternatives become available in selecting molding materials for the housing 9, and hence degree of freedom is increased in designing the fluid dynamic bearing device 1. In order to impart conductivity to the housing 9 made of resin, it is necessary to mix an expensive conductive filler into the resin material. In the present invention, it is unnecessary to mix the conductive filler of this type, or possible to reduce a mixing amount thereof. Thus, an increase in material cost can be suppressed.

The present invention is not limitedly applied to the above-mentioned embodiment. In the following, description is made on other embodiments of the present invention. Note that, in the other embodiment described in the following, the portions having the same structures and functions as those in the above-mentioned embodiment are described while denoted by the same reference symbols, and redundant description thereof is omitted.

Figure 8:
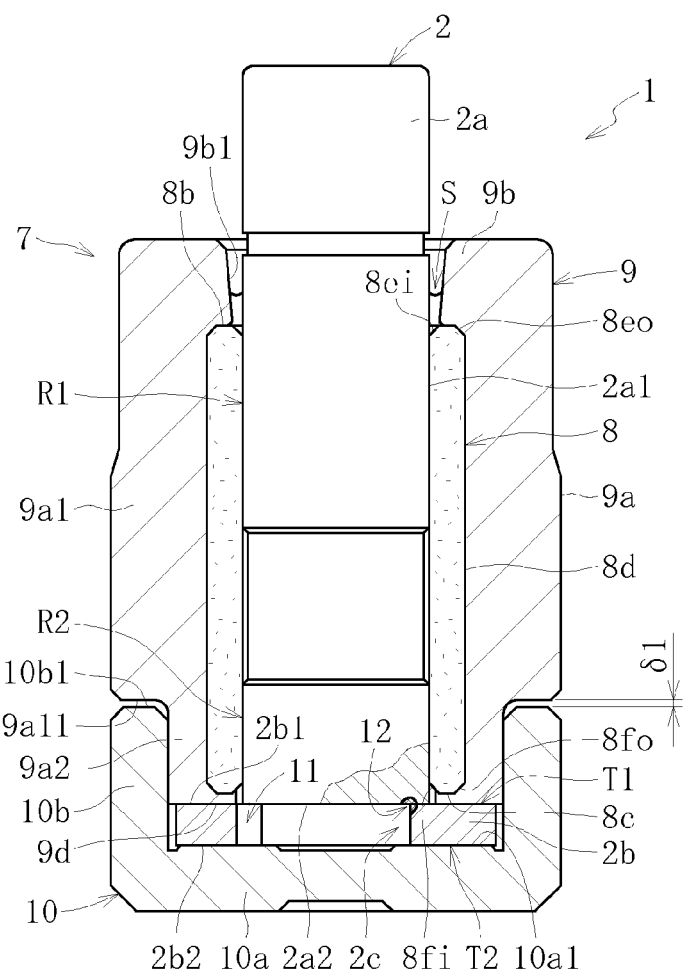
FIG. 8 is a sectional view of a fluid dynamic bearing device according to a second embodiment of the present invention.

FIG. 8 illustrates the fluid dynamic bearing device 1 according to a second embodiment of the present invention. Similarly to the fluid dynamic bearing device 1 illustrated in FIG. 2, the housing 9 is formed by injection molding of a resin while the bearing sleeve 8 is inserted therein, and the lid member 10 made of metal is fixed to the outer peripheral surface of the housing 9, specifically, to the outer peripheral surface of the thin portion 9a2. After setting of the thrust bearing gaps, an axial gap 51 is formed between the upper end surface 10b1 of the cylindrical portion 10b of the lid member 10 and the lower end surface 9a11 of the thick portion 9a1 of the housing 9.

In the fluid dynamic bearing device 1 according to the second embodiment, a coating portion 9d extending to the radially inner side is formed at the lower end of the thin portion 9a2 of the housing 9, and covers not only the outer peripheral chamfer 8fo of the bearing sleeve 8 but also the entire of the lower end surface 8c of the bearing sleeve 8. In an end surface of the coating portion 9d, there are formed a plurality of dynamic pressure grooves functioning as the thrust dynamic pressure generating portion of the first thrust bearing portion T1 (herringbone dynamic pressure grooves illustrated in FIG. 4, for example). Note that, the inner peripheral chamfer 8fi at the lower end of the bearing sleeve 8 is not covered with the coating portion 9d.

As described above, formation of the thrust dynamic pressure generating portion on the coating portion 9d of the housing 9 allows omission of the thrust dynamic pressure generating portion formed on the lower end surface 8c of the bearing sleeve 8. Thus, it is possible to reduce the thickness in the radial direction of the bearing sleeve 8 in comparison with that in the embodiment illustrated in FIG. 2. The thinning allows reduction in oil containing amount of the bearing sleeve 8 made of sintered metal. Thus, it is possible to reduce an oil retaining amount of the entire of the bearing device, and possible to reduce a thermal expansion amount of oil at the time of rise in temperature. Accordingly, it is possible to reduce the volume of the seal space S, and possible to downsize the entire of the bearing device in the axial direction by reducing the axial dimension of the seal space S. Alternatively, it is possible to enhance rotational accuracy in the radial direction by increasing the span between the radial bearing portions R1 and R2.

Note that, the thrust dynamic pressure generating portion of the coating portion 9d can be formed by die molding simultaneously with injection molding of the housing 9 when grooves corresponding to the thrust dynamic pressure generating portion are formed beforehand in the die for molding the housing 9. Thus, it is possible to omit a forming step of the thrust dynamic pressure generating portion, and possible to achieve cost reduction. Further, in accordance with the reduction in axial dimension of the seal space S, difference in thickness is reduced between the seal portion 9b and the main body portion 9a in the housing 9, and hence deformation of a resin at the time of molding shrinkage less likely to occur. Thus, in the fluid dynamic bearing device 1 in this embodiment, the chamfered portion 9c to be formed on the radially outer portion at the upper end of the housing 9 (refer to FIG. 2) is omitted.

Figure 9:
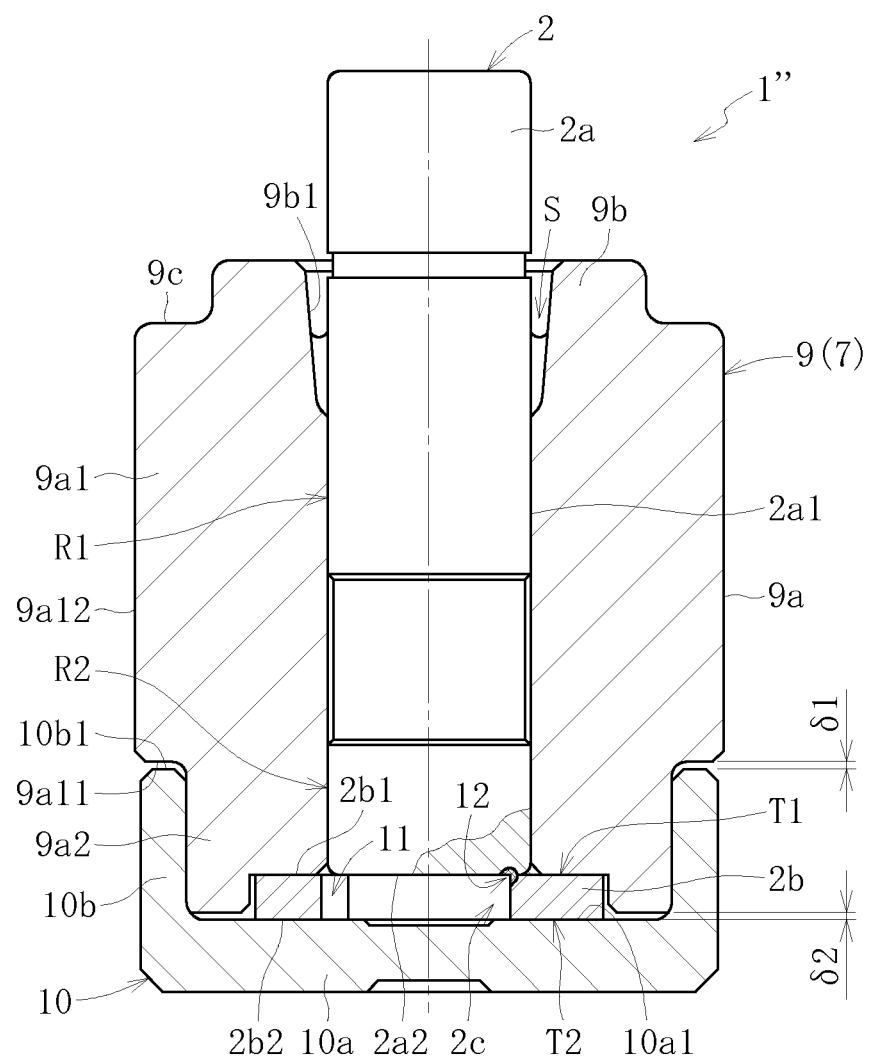
FIG. 9 is a sectional view of a fluid dynamic bearing device according to a third embodiment of the present invention.

FIG. 9 illustrates the fluid dynamic bearing device 1 according to a third embodiment of the present invention. The embodiment illustrated in the figure is structurally different from the above-mentioned embodiments in that the outer member 7 is integrated with the following illustrated in FIGS. 2 and 8: the bearing sleeve 8 serving as a bearing portion; and the housing 9 serving as a retaining portion for retaining the bearing sleeve 8. That is, radial bearing gaps (radial bearing portions R1 and R2) are formed between the outer peripheral surface 2a1 of the shaft member 2 and the inner peripheral surface of the outer member 7, and a first thrust bearing gap (first thrust bearing portion T1) is formed between the upper end surface 2b1 of the flange portion 2b and the lower end surface of the outer member 7. Note that, the outer member 7 illustrated in this embodiment may be formed by injection molding of a resin or metal, or may be molded by forging.

Description is hereinabove made on the respective fluid dynamic bearing devices in which the outer member 7 is arranged on the outer periphery of the shaft member 2 having the flange portion 2b provided with the fluid path 11, the outer member 7 being formed by injection molding of the housing 9 while the bearing sleeve 8 is inserted therein, or being integrated with portions corresponding to the bearing sleeve 8 and the housing 9. As a matter of course, the shaft member 2 described hereinabove can be used while being incorporated in fluid dynamic bearing devices according to that disclosed in Patent Document 1 mentioned above, specifically, incorporated in the fluid dynamic bearing device 1 illustrated in FIG. 10. The fluid dynamic bearing device 1 illustrated in the figure is structurally different from the fluid dynamic bearing device 1 illustrated in FIG. 2 in mainly including the housing 9, the bearing sleeve 8, a seal member 13, and the lid member 10 which are prepared separately from each other and in fixing the other members on the fixation side (bearing sleeve 8 and the like) to the inner periphery of the housing 9 by bonding or the like. In the structure according to this embodiment, in which the outer member 7 is constituted by fixing the housing 9 and the bearing sleeve 8 which are separately prepared to each other by bonding or the like in this manner, it is possible to provide a fluid path 14 between the inner peripheral surface of the housing 9 and an outer peripheral surface 8d of the bearing sleeve 8, the fluid path 14 being formed by opening both the end surfaces of the bearing sleeve 8. In this case, it is possible to cause a lubricating oil to flow and circulate in the bearing through the fluid path 14, and hence possible to more effectively prevent a problem of impaired pressure balance.

Figure 10:
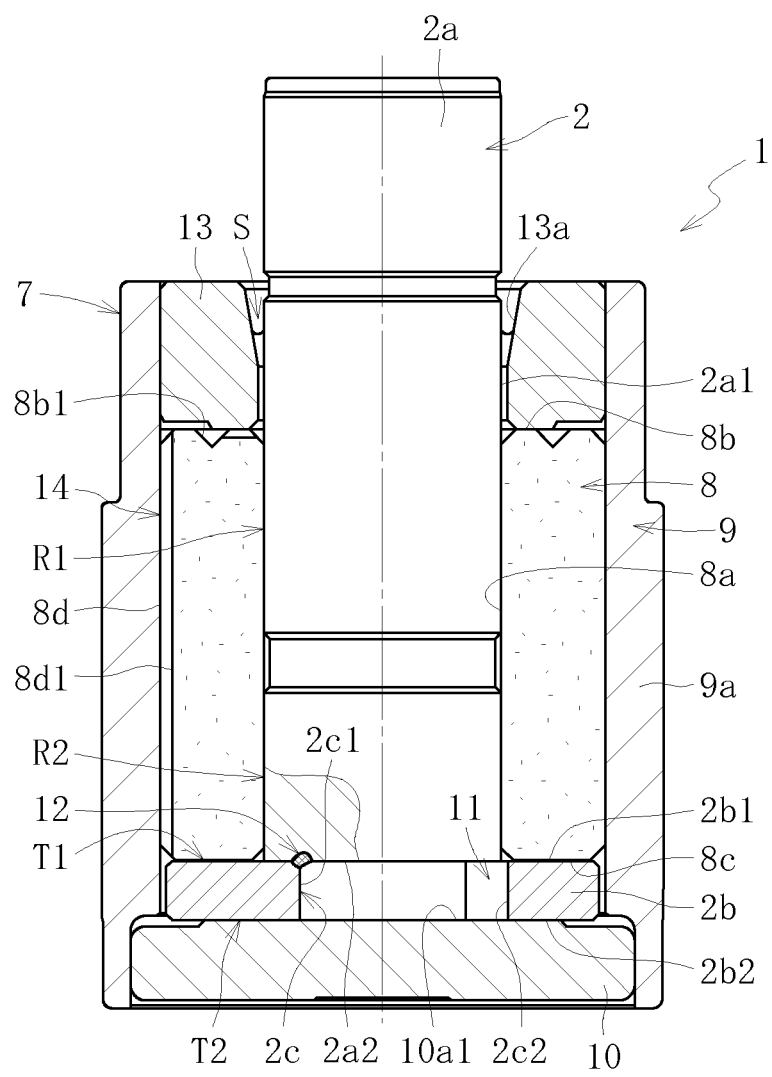
FIG. 10 is a sectional view of a fluid dynamic bearing device according to a fourth embodiment of the present invention.
Figure 11:
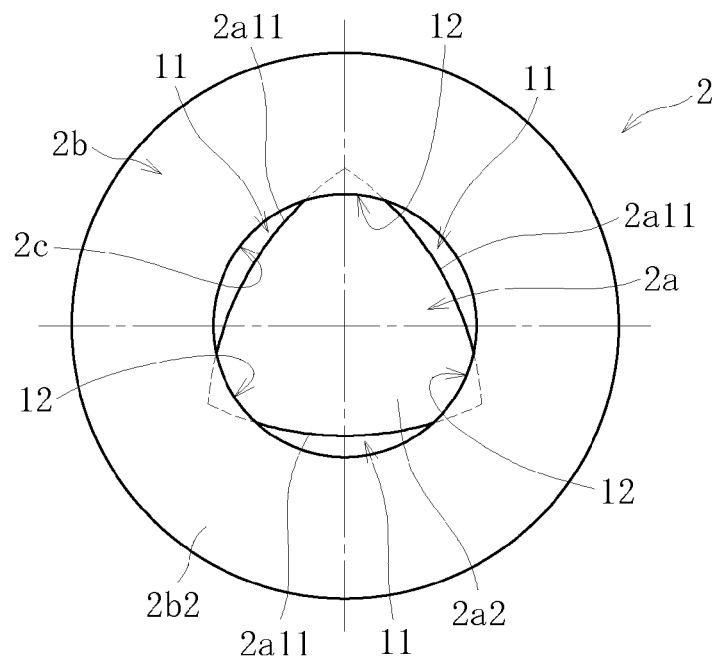
FIG. 11 is a plan view seen from a lower side of the shaft member according to another embodiment.

Description is hereinabove made on the case where the through-hole 2c having a non-circular shape is provided in the flange portion 2b, and the shaft portion 2a and the flange portion 2b are coupled with each other in a state of butting the lower end surface 2a2 of the shaft portion 2a having a complete circular shape in cross section against the upper end surface 2b1 of the flange portion 2b, with the result that the fluid path 11 is formed by opening both the end surfaces 2b1 and 2b2 of the flange portion 2b. The fluid path 11 may be formed otherwise. For example, as illustrated in FIG. 10, it is also possible to form a fluid path 11 similar to the above-mentioned one through formation of the through-hole 2c having a complete circular shape in cross section in the flange portion 2b and coupling of the lower end surface 2a2 and the upper end surface 2b1 with each other in the state of butting the lower end surface 2a2 of the shaft portion 2a at least the lower end of which is formed into a non-circular shape in cross section against the upper end surface 2b1 of the flange portion 2b. Note that, FIG. 11 illustrates a case in which the lower end outer peripheral surface of the shaft portion 2a is constituted by three circular-arc surfaces 2a11.

Figure 12:
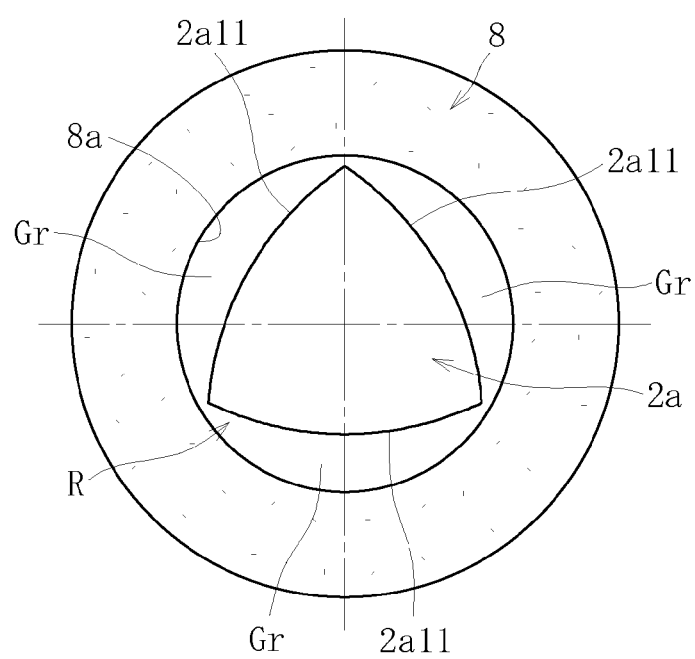
FIG. 12 illustrates a case where a radial bearing portion is constituted by a multi-arc bearing.

In this case, it is also possible to form a wedge-like radial bearing gap (wedge-like gap Gr) between the outer peripheral surface 2a11 of the shaft portion 2a and the inner peripheral surface 8a of the bearing sleeve 8 through forming not only the lower end portion of the shaft portion 2a, which is coupled integrally with the flange portion 2b, but the entire of the shaft portion 2a into a non-circular shape in cross section, for example, as illustrated in FIG. 12, and through arrangement of the bearing sleeve 8 having the inner peripheral surface 8a on the outer periphery of the shaft portion 2a. With this, it is possible not only to form the fluid path 11 in the above-mentioned mode in the flange portion 2b, but also to constitute, without provision of dynamic pressure grooves having a complicated shape in any one of the inner peripheral surface of the bearing sleeve 8 and in the outer peripheral surface 2a11 of the shaft portion 2a which are opposed to each other, the radial bearing portions R with multi-arc bearings which are categorized as a type of fluid dynamic bearings.

Note that, while not shown, it is also possible to form a fluid path 11 similar to the above-mentioned one through coupling of the lower end surface 2a2 and the upper end surface 2b1 with each other in the state of butting the lower end surface 2a2 of the shaft portion 2a at least the lower end of which is formed into a non-circular shape in cross section against the upper end surface 2b1 of the flange portion 2b provided with the through-hole 2c having a non-circular shape.

Further, description is hereinabove made on the case where the radial bearing portions R1 and R2 are constituted by the dynamic pressure bearings in which dynamic pressure effects are generated by the dynamic pressure grooves arranged in a herringbone pattern or the like, and the radial bearing portions R are constituted by multi-arc bearings which are categorized as a type of fluid dynamic bearings. The radial bearing portions may be constituted by other well-known dynamic pressure bearings such as so-called step bearings and corrugated bearings. Alternatively, the radial bearing portions may be constituted by cylindrical bearings in which two surfaces opposed to each other through an intermediation of the radial bearing gap (both outer peripheral surface 2a1 of shaft portion 2a and inner peripheral surface 8a of bearing sleeve 8 in the embodiments described above) are formed as cylindrical surfaces.

Further, in the embodiments described above, description is made on the case where the thrust bearing portions T1 and T2 are constituted by the dynamic pressure bearings in which dynamic pressure effects are generated by the dynamic pressure grooves arranged in a herringbone pattern or the like. Any one or both of the thrust bearing portions T1 and T2 may be constituted by other well-known dynamic pressure bearings such as so-called step bearings and corrugated bearings.

The invention claimed is:

1. A fluid dynamic bearing device, comprising:
    a shaft member comprising:
        a shaft portion, and
        a flange portion, the flange portion having a first end surface and a second end surface, the second end surface of the flange portion being disposed on an extreme end surface of the shaft portion, in an axial direction,
    wherein a through-hole is provided in the flange portion, the through-hole extending in the axial direction and opened at both the first end surface and the second end surface of the flange portion, a portion of the through-hole facing the extreme end surface of the shaft portion,
    wherein a first portion of the second end surface of the flange portion and the extreme end surface of the shaft portion are coupled to each other, thereby forming a coupling portion, the shaft portion and flange portion being integrated in a coupling manner by the coupling portion,
    wherein a second portion of the second end surface of the flange portion and the extreme end surface of the shaft portion are not coupled to each other, thereby forming a fluid path through the through-hole,
    wherein the fluid path is defined by the extreme end surface of the shaft portion and an inner wall surface of the through-hole,
    wherein the coupling portion of the second end surface of the flange portion and the extreme end surface of the shaft portion is subjected to laser welding, and
    wherein the coupling portion is formed by applying a laser beam through the through-hole from a side of the first end surface of the flange portion.

2. The fluid dynamic bearing device according to claim 1, wherein the second portion of the second end surface of the flange portion is radially outside of an outer peripheral surface of the shaft portion, at the extreme end surface of the shaft portion.

3. The fluid dynamic bearing device according to claim 1, wherein the through-hole is formed into a non-circular shape.

4. The fluid dynamic bearing device according to claim 1, wherein the through-hole is formed by press working.

5. The fluid dynamic bearing device according to claim 1, further comprising:
    an outer member disposed on an outer peripheral surface of the shaft member, and opened at both axial ends thereof; and
    a lid member closing an opening portion at one of the axial ends of the outer member,
    wherein the outer member is provided with:
        a bearing portion such that a radial bearing gap is formed between the outer member and the outer peripheral surface of the shaft member; and
        a retaining portion for retaining the bearing portion, the retaining portion comprising an attachment portion with respect to a motor base; and
    wherein the lid member is fixed to an outer peripheral surface of the outer member.

6. The fluid dynamic bearing device according to claim 5, wherein the retaining portion of the outer member is formed by injection molding while the bearing portion is inserted therein.

* * * * *